United States Patent [19]

Licari

[11] 3,966,255

[45] June 29, 1976

[54] BOTTOM DUMP VEHICLE

[75] Inventor: Vincent Licari, Emmaus, Pa.

[73] Assignee: Mack Trucks, Inc., Allentown, Pa.

[22] Filed: Mar. 5, 1975

[21] Appl. No.: 555,629

[52] U.S. Cl. .............................. 298/35 M; 180/51; 296/28 D
[51] Int. Cl.² .......................................... B60P 1/00
[58] Field of Search .................. 298/24, 25, 26, 27, 298/28, 29, 30, 31, 32, 33, 34, 35 R, 35 M, 36, 37; 296/28 D; 180/11, 51; 105/240, 250–252

[56] References Cited
UNITED STATES PATENTS

| | | | |
|---|---|---|---|
| 3,353,693 | 11/1967 | Zink | 298/28 X |
| 3,437,163 | 4/1969 | Lemmerman | 180/51 |
| 3,768,184 | 10/1973 | Sundgelin | 298/25 X |
| 3,910,635 | 10/1975 | Holland | 298/35 M |

FOREIGN PATENTS OR APPLICATIONS

| | | | |
|---|---|---|---|
| 883,620 | 10/1971 | Canada | 180/51 |

Primary Examiner—Frank E. Werner
Attorney, Agent, or Firm—Brumbaugh, Graves, Donohue & Raymond

[57] ABSTRACT

A bottom dump vehicle has a driver's cab mounted on the front portion of the vehicle and an engine mounted on the rear portion thereof. The vehicle has a front and a rear axle, each of which mounts a plurality of wheels. A drive train extends from the engine to both the front and the rear axles so that all wheels of the vehicle are driven. A load-carrying hopper is mounted on the rear portion of the vehicle to receive loads of earth, for example. The drive train includes a drive shaft that extends lengthwise of the rear portion of the vehicle through a tunnel member located at the bottom of the load-carrying hopper. A pair of dump doors defining at least part of the bottom of the hopper are located on opposite sides of the tunnel member and are mounted so as to be movable away from each other to provide a dump opening in the bottom of the hopper. When the dump doors are in a closed position, they butt against opposite side walls of the tunnel member.

11 Claims, 3 Drawing Figures

U.S. Patent  June 29, 1976  Sheet 2 of 2  3,966,255
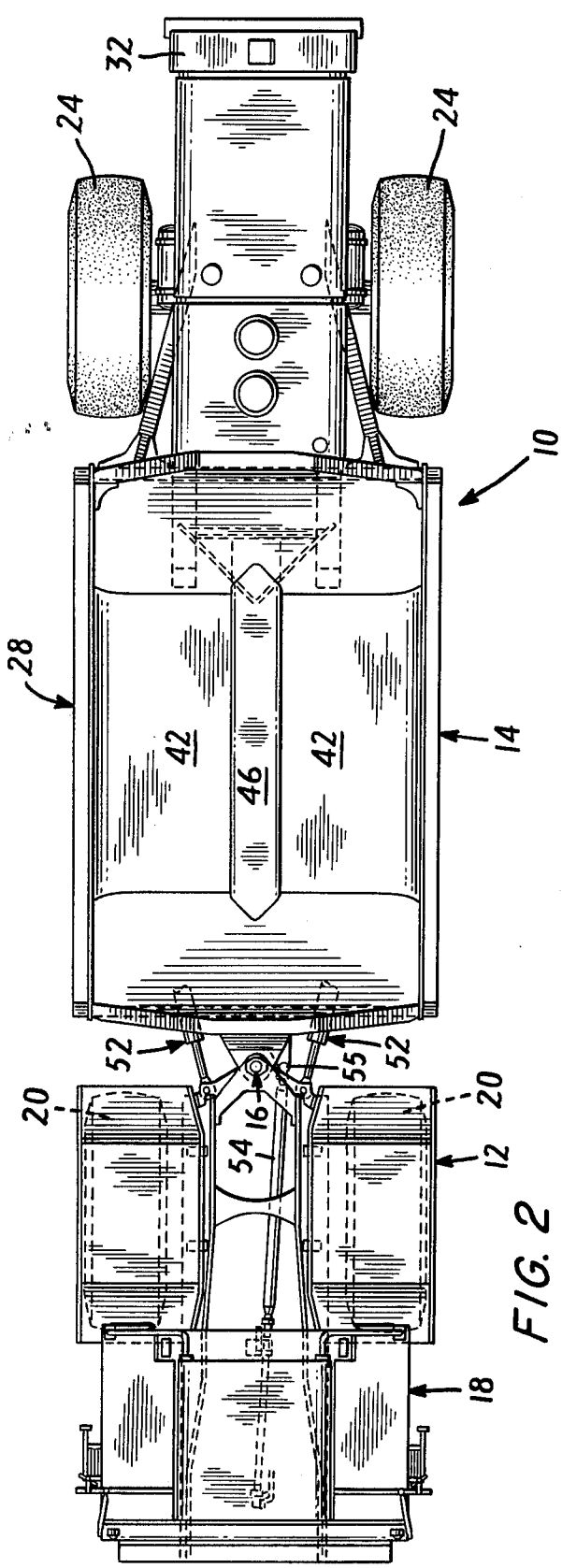
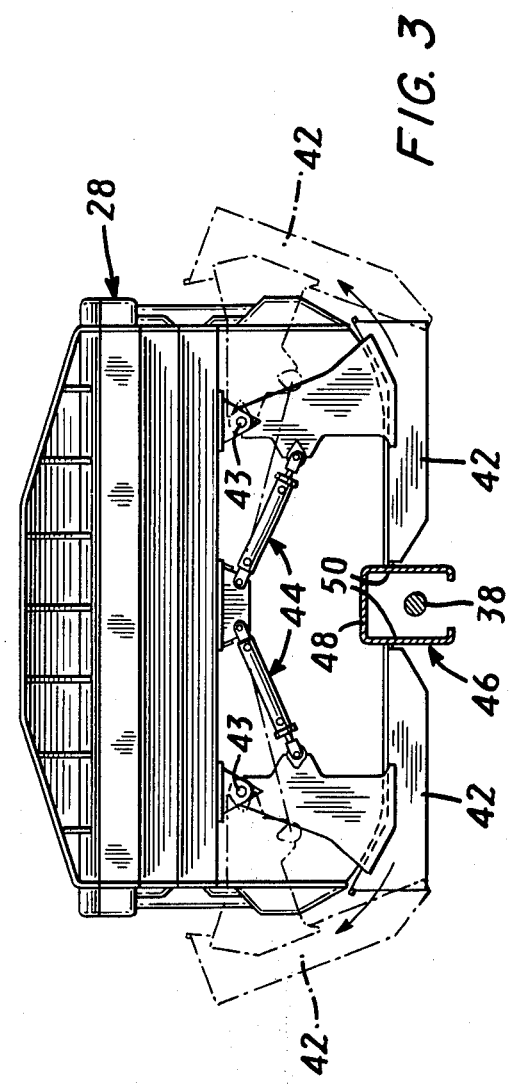

BOTTOM DUMP VEHICLE

BACKGROUND OF THE INVENTION

An often used piece of off-highway construction equipment is a bottom dump truck consisting of a tractor or prime mover and a towed, load-carrying semi-trailer. The semi-trailer has a pair of abutting dump doors in its bottom to permit earth or similar loads carried in the trailer to be dumped between the wheels thereof as the truck moves along. The use of the typical bottom dump truck is limited to relatively smooth terrain and fairly stable surfaces, since only the tractor portion of the truck provides a force to move the truck, and the towed trailer, when fully loaded, can easily become bogged down in sandy or damp soils, for example.

In other types of wheeled, off-highway construction equipment, it has been proposed to extend the range of conditions under which such equipment can operate by providing all-wheel drive through two drive engines, one mounted on the front to drive the front wheels and one mounted on the rear to drive the rear wheels. The two-engine, all-wheel drive arrangement is often seen in construction equipment termed "scrapers" or "pans" that can be run along a surface to scrape earth into a load-carrying hopper. When full, the hopper is closed by a large blade-like closure and the body of the scraper is raised from the ground to permit the scraper to move away from the construction site. The use of two engines greatly increases the production and operating costs of a piece of off-highway equipment and is probably justified for scrapers only because a single engine scraper is generally pushed by a bulldozer, for example, in order to build up a full hopper load. A two-engine, all-wheel drive scraper, on the other hand, has sufficient power and traction to scrape up a full load of earth generally without the assistance of a pushing bulldozer, thus freeing the bulldozer and its operator for other work.

Outside the construction field, general purpose off-highway vehicles have been proposed in which a single engine drives all of the wheels of both front and rear sections of the vehicle, the two vehicle sections being articulated together. Off-highway, general purpose vehicles are described and illustrated in the Holland U.S. Pat. No. 3,630,302 and in the Mueller et al. U.S. Pat. No. 3,802,526. It has also been proposed to have a drive engine mounted on the trailer section of a tractor-trailer highway vehicle to drive both front and rear wheels of the vehicle. Examples of such tractor-trailer vehicles are described and illustrated in the Brown U.S. Pat. No. 2,648,392 and the Lewis U.S. Pat. No. 3,454,123.

In order to meet the requirements of the strip mining industry, for example, it would be desirable to have a bottom dump truck having all-wheel drive so that the truck could travel over any type of terrain. While it might initially seem possible to construct a bottom truck similar to the vehicles illustrated in the Holland and Mueller et al. patents, the bottom dump feature raises problems not encountered in the Holland and Mueller et al. vehicles, which utilize load-carrying beds or boxes having solid floors. Specifically, the drive shaft, which extends between the two vehicle sections and which runs under the rear vehicle section in both the Holland and Mueller et al. vehicles, cannot be run under the rear section of a bottom dump truck without interfering with the dump doors. If one were to adopt the construction of the prior art scrapers, however, and utilize separate engines for the front and rear wheels, the result would be an excessively costly and possibly overpowered vehicle which, unlike a dual engine scraper, could not justify its high costs by offering the advantage of freeing an additional piece of equipment, such as a bulldozer. Similarly, to couple a prime mover in one vehicle section with hydraulic or electric motor(s) in the other section by means of hydraulic or electric conduits, which could be routed laterally of the dump doors to avoid interference therewith, would involve a complex and costly drive train, as compared with conventional drive shafts and differential and planetary gearing.

SUMMARY OF THE INVENTION

The present invention is directed to an off-highway, bottom dump vehicle that has a single engine which drives both the front and the rear wheels of the vehicle. This desirable result is achieved by providing a protective tunnel down the middle of the rear section of the vehicle between the dump doors, which butt against the protective tunnel when they are closed. The drive shaft that extends between the vehicle front and rear sections is mounted within the protective tunnel so that the vehicle has a bottom dump feature without risk of damage to the drive shaft.

According to the invention, an off-highway, bottom dump vehicle has a frame and a cab mounted on the front portion of the frame. The engine for the vehicle is mounted on the rear portion of the frame, and the frame is supported by front and rear axles spaced from each other lengthwise of the frame. A drive train couples the engine to both front and rear axles, and hence to the front and rear wheels. A box or hopper on the central portion of the frame is adapted to carry a load and has a pair of bottom dump doors. A tunnel member extends lengthwise of the load-carrying hopper and includes a top cover and two laterally spaced apart side walls. The dump doors of the hopper are located on opposite sides of the tunnel member and, when closed, butt against the side walls thereof. At least one drive shaft, comprising a part of the drive train, extends lengthwise of the frame across the bottom of the hopper within the tunnel member.

In a preferred embodiment of the invention, the frame includes front and rear sections that are articulated by means of a coupling that is hinged about a generally vertical axis. The vehicle is steered by a pair of hydraulic cylinders, located one on each side of the articulative coupling and extending between the vehicle front and rear sections. The cylinders are energized in response to rotational movement of the steering wheel in order to effect steering of the vehicle.

A bottom dump vehicle constructed according to the present invention is a particularly efficient, all-terrain vehicle having all-wheel drive. The vehicle has adequate traction over rough terrain and on severe grades because the front and rear axles mount driven wheels, and the cost of the vehicle is relatively low because a single power source provides the all-wheel drive. By locating the engine and transmission on the rear portion of the vehicle, maintenance of these components is facilitated, cab construction is simple, and the cab is isolated from the engine and transmission noise and vibration.

BRIEF DESCRIPTION OF THE DRAWINGS

For better understanding of the invention, reference may be made to the following description of an exemplary embodiment, taken in conjunction with the figures of the accompanying drawings, in which:

FIG. 2 is a plan view of the vehicle shown in FIG. 1; and

FIG. 3 is a view taken along the line 3—3 of FIG. 1 and looking in the direction of the arrows.

DESCRIPTION OF AN EXEMPLARY EMBODIMENT

Figure 1:
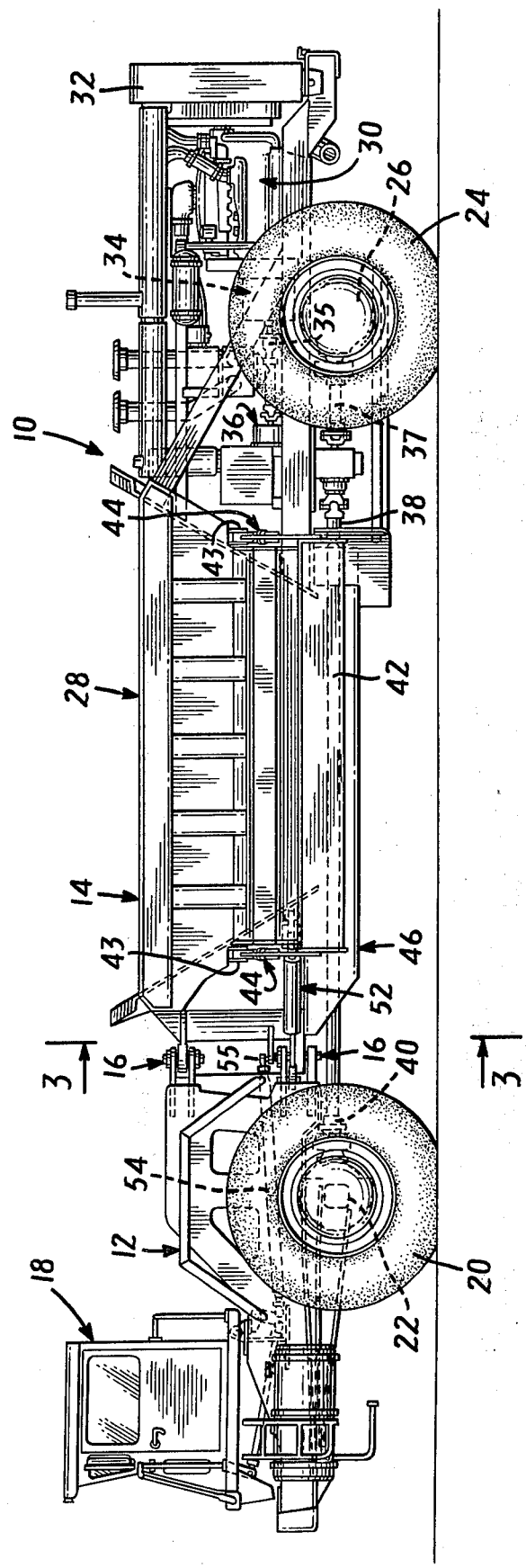
FIG. 1 is a side elevational view of an off-highway, bottom dump vehicle constructed according to the invention.

FIG. 1 illustrates an off-highway, bottom dump vehicle 10, which includes a front cab section 12 and a rear load-carrying section 14. The front of the load-carrying section 14 is articulated with the rear of the cab section 12 by a pair of spaced coaxial hinges 16, which pivot about a vertical axis. The front section 12 mounts a driver's cab 18 and is supported by a pair of front wheels 20 mounted on opposite ends of a front axle 22. The front axle 22 is unitary and is pivotally mounted at its center to the cab section 12 to permit movement of the front wheels 20 through limited vertical angles. Spring elements (not shown) couple opposite ends of the front axle 22 with the cab section 12 and isolate the cab 18 from the motion of the axle 22.

The rear section 14 of the vehicle 10 is supported on a pair of rear wheels 24 mounted on opposite ends of a unitary rear axle 26, which is mounted adjacent the rear of the vehicle. The portion of the rear section 14 between the articulative coupling 16 and the rear axle 26 mounts a load-carrying receptacle or hopper 28, and a conventional engine 30 is mounted aft of the rear axle 26, the usual radiator 32 being at the extreme rear of the vehicle.

The engine 30 drives a conventional torque converter 34, and a drive shaft 35 couples the converter with a suitable hydraulic transmission 36, having eight forward speeds and four reverse speeds, for example. Two output shafts 37 and 38 transmit power from the transmission 36 to the rear and front axles 26 and 22, respectively. The rear axle drive shaft 37 is coupled to the rear axle 26 through a conventional limited slip differential (not shown). The rear axle 26 is conventional and has a one-piece cast steel housing and heavy-duty planetary gears mounted on roller bearings (not shown). The front axle drive shaft 38 similarly is coupled to the front axle 22 through a conventional limited slip differential (not shown), and the front axle 22 is substantially identical to the rear axle 26. Adjacent the articulative coupling 16 between the front and rear vehicle sections 12 and 14, the drive shaft 38 is articulated by a conventional universal joint 40. Additional universal joints may be utilized in the shaft 38 as necessary to keep the length of shaft sections sufficiently short to prevent "whipping" of the shaft sections when the shaft 38 is driven.

In coupling the transmission 36 with the front axle 22, the drive shaft 38 extends along the bottom of the load-carrying hopper 28. The hopper 28 has a bottom dump capability and to this end includes a pair of dump doors 42 that define the bottom of the hopper and are pivotally mounted at 43 to the hopper, the dump doors being operated by front and rear pairs of conventional hydraulic cylinders 44. In order that the shaft 38 extend along the bottom of the hopper 28 without interfering with the action of the dump doors 42 or subjecting the shaft 38 to damage from loads of earth or stone being dumped, the bottom of the hopper 28 includes a centrally located tunnel member 46 extending lengthwise of the hopper, the shaft 38 extending through the tunnel member. As best shown in FIG. 3, the tunnel member 46 has a generally rectangular cross-section with an upper cover portion 48 disposed above the shaft 38 and a pair of laterally spaced apart side portions 50. The dump doors 42 are constructed and mounted such that, when they are closed, the inner edges of the doors butt against the side wall portions 50 of the tunnel member 46, as shown in full in FIG. 3. When the hydraulic cylinders 44 are energized to open the dump doors 42, the doors swing up and outwardly away from the tunnel member 46 to the fully open positions shown in phantom in FIG. 3, thereby dumping the contents of the hopper 28. After the contents have been dumped, the cylinders 44 may be energized to return the dump doors to the closed position.

The vehicle 10 is steered by appropriate energization of a pair of conventional hydraulic cylinders 52, as best shown in FIG. 2. The cylinders 52 are mounted one on each side of the articulative coupling 16 between the rear of the cab section 12 and the front of the load-carrying section 14. The operation of the cylinders 52 is conventional and involves the opening of a spool valve (not shown) in response to a rotating or turning motion of the steering wheel (not shown) in the vehicle cab 18. The opened spool valve releases a flow of pressurized hydraulic fluid that expands or contracts the respective cylinders 52 as directed by the movement of the steering wheel. The relative disposition of the front and rear sections 12 and 14 is sensed by a mechanical linkage that includes a shaft 54 pivotally linked at 55 to the front of load-carrying section 14, the link 55 being disposed laterally of the axis of the hinges 16 so as to translate relative angular motion of the vehicle sections into fore and aft displacement of the shaft 54. When the proper angular orientation between the two vehicle sections is reached, the mechanical linkage closes the spool valve and shuts off further flow of hydraulic fluid to the steering cylinders 52. The angle of steering in either direction may be limited to 40°, for example.

It will be understood that the embodiment of the invention described above is merely exemplary and that persons skilled in the art may make many variations and modifications without departing from the spirit and scope of the invention. For example, the novel bottom dump, all-wheel drive capability may be employed in a vehicle having a unitary frame, or in a vehicle in which tracks are substituted for the wheels 20 and/or 24. All such modifications and variations are intended to be within the scope of the invention as defined in the appended claims.

I claim:
1. In a vehicle including:
 a. a front section having at least one front axle and a plurality of wheels mounted on the axle;
 b. a rear section having at least one rear axle and a plurality of wheels mounted on the rear axle, the rear section also having a receptacle adapted to receive and carry loads; and
 c. means articulative about a generally vertical axis for coupling together the front and rear sections;
 the improvement comprising:

d. an engine mounted on the rear section of the vehicle;
e. drive train means operatively coupling the engine to the front wheels, the drive train means including at least one drive shaft extending lengthwise of the rear section of the vehicle;
f. a tunnel member on the rear section of the vehicle having at least a top cover portion and two laterally spaced apart side wall portions, the tunnel member extending lengthwise of the rear section of the vehicle and enclosing the drive shaft; and
g. a pair of dump doors defining at least part of the bottom of the load-carrying receptacle and being mounted so as to be movable away from each other to produce a dump opening in the bottom of the load-carrying receptacle, the tunnel member extending lengthwise across the dump opening.

2. The vehicle of claim 1, wherein the dump doors are located on opposite sides of the tunnel member and, when in closed positions, butt against opposite side wall portions of the tunnel member.

3. The vehicle of claim 1, also including drive train means operatively coupling the engine to the rear wheels of the vehicle.

4. The vehicle of claim 1, wherein the drive train means includes a transmission mounted on the rear section of the vehicle.

5. In a vehicle including:
a. a frame;
b. a cab mounted on a front portion of the frame;
c. an engine mounted on a rear portion of the frame;
d. a front axle and a rear axle spaced apart from each other longitudinally of the frame;
e. a pair of front wheels mounted on the front axle;
f. a pair of rear wheels mounted on the rear axle;
g. drive train means operatively coupling the engine to the front and the rear wheels; and
h. a receptacle on the rear portion of the frame adapted to receive and carry loads;
the improvement comprising:
i. a tunnel member in the rear portion of the vehicle having a top cover portion and two laterally spaced apart side wall portions, the tunnel member extending lengthwise of the rear portion of the vehicle; and
j. a pair of dump doors defining at least part of the bottom of the load-carrying receptacle and being mounted so as to be movable away from each other to produce a dump opening in the bottom of the receptacle,
the tunnel member extending lengthwise across the dump opening and the drive train means including at least one drive shaft extending lengthwise of the frame so as to be enclosed by the tunnel member.

6. The vehicle of claim 5, wherein the dump doors are located on opposite sides of the tunnel member and, when in closed positions, butt against opposite side wall portions of the tunnel member.

7. The vehicle of claim 5, where the front and the rear portions of the vehicle frame are coupled together by coupling means articulative about a generally vertical axis.

8. A bottom dump vehicle comprising:
a. a front section having a driver's cab, at least one front axle, and a pair of front wheels mounted on the front axle;
b. a rear section having at least one rear axle and a pair of rear wheels mounted on the rear axle, the rear section also having a hopper adapted to receive and carry loads;
c. means articulative about a generally vertical axis for coupling together the front and rear sections;
d. an engine mounted on the rear vehicle section;
e. means defining a drive train that operatively couples the engine to the front and rear wheels, the drive train means including at least one drive shaft extending lengthwise of the rear vehicle section and coupling the engine to the front wheels;
f. a tunnel member on the rear vehicle section having a top cover portion and two laterally spaced apart side wall portions, the tunnel member extending lengthwise of the rear vehicle section and enclosing the drive shaft; and
g. a pair of dump doors defining at least part of the bottom of the load-carrying hopper, the dump doors being located on opposite sides of the tunnel member and being mounted so as to be movable away from each other to produce a dump opening in the bottom of the hopper, and the doors, when in closed positions, butting against opposite side wall portions of the tunnel member, and the tunnel member extending lengthwise across the dump opening.

9. A bottom dump vehicle according to claim 8, also including hydraulic cylinder means disposed on each side of the articulative coupling means and extending between the front and rear vehicle sections, the hydraulic cylinder means being energizeable to steer the vehicle.

10. A bottom dump vehicle according to claim 8, wherein the hopper is disposed between the articulative coupling means and the engine.

11. A bottom dump vehicle according to claim 8, also including means for moving the dump doors away from and toward each other.

* * * * *